United States Patent
Fu et al.

(10) Patent No.: US 9,332,529 B2
(45) Date of Patent: May 3, 2016

(54) PHYSICAL DOWNLINK SHARED CHANNEL TRANSMISSION METHOD

(71) Applicant: Samsung Electronics Co., Ltd., Gyeonggi-do (KR)

(72) Inventors: Jingxing Fu, Beijing (CN); Chengjun Sun, Beijing (CN); Yingyang Li, Beijing (CN)

(73) Assignee: Samsung Electronics Co., Ltd (KR)

( * ) Notice: Subject to any disclaimer, the term of this patent is extended or adjusted under 35 U.S.C. 154(b) by 349 days.

(21) Appl. No.: 13/837,971

(22) Filed: Mar. 15, 2013

(65) Prior Publication Data
US 2013/0242910 A1    Sep. 19, 2013

(30) Foreign Application Priority Data
Mar. 16, 2012    (CN) .......................... 2012 1 0071047

(51) Int. Cl.
*H04W 72/04*    (2009.01)
*H04W 72/12*    (2009.01)
*H04L 1/18*    (2006.01)

(52) U.S. Cl.
CPC ............. *H04W 72/04* (2013.01); *H04L 1/1861* (2013.01); *H04L 1/1864* (2013.01); *H04L 1/1887* (2013.01); *H04W 72/1273* (2013.01)

(58) Field of Classification Search
None
See application file for complete search history.

(56) References Cited

U.S. PATENT DOCUMENTS

| 2011/0243066 A1 | 10/2011 | Nayeb et al. |
| 2011/0243106 A1 | 10/2011 | Hsu et al. |
| 2011/0310818 A1 | 12/2011 | Lin et al. |
| 2012/0113941 A1 | 5/2012 | Chung et al. |
| 2012/0300741 A1 | 11/2012 | Han et al. |
| 2013/0039284 A1* | 2/2013 | Marinier et al. ............... 370/329 |
| 2013/0114472 A1* | 5/2013 | Tamaki et al. ................. 370/280 |
| 2014/0328292 A1* | 11/2014 | Yang ..................... H04L 1/1812 370/329 |
| 2015/0036603 A1* | 2/2015 | Yang et al. .................... 370/329 |

FOREIGN PATENT DOCUMENTS

| KR | 10-2011-0090783 | 8/2011 |
| WO | WO 2011/005032 | 1/2011 |

OTHER PUBLICATIONS

Samsung, "Scheduling Timing in CA with Different TDD UL-DL Configurations", R1-114219, 3GPP TSG RAN WG1 #67, Nov. 14, 2011.
MediaTek Inc., "Discussion on HARQ Feedback Mechanism and Cross-Carrier Scheduling in Inter-Band CA with Different TDD UL-DL Configurations".
R1-113864, 3GPP TSG-RAN WG1 Meeting #67, Nov. 14, 2011.

(Continued)

*Primary Examiner* — Christine Duong
(74) *Attorney, Agent, or Firm* — The Farrell Law Firm, P.C.

(57) ABSTRACT

A Physical Downlink Shared CHannel (PDSCH) transmission data method is provided. A User Equipment (UE) receives cross-carrier scheduling information in a PDCCH of a cell for scheduling. The cross-carrier scheduling information carries scheduling information indicating at least one PDSCH in at least one sub-frame of a cell being scheduled in cross-carrier scheduling. The UE processes data of PDSCH corresponding to the instruction according to received cross-carrier scheduling information. The UE sends a HARQ-ACK message to a base station according to the processed result. The peak rate of the UE is increased, and the requirement for higher throughput of the UE is satisfied.

20 Claims, 7 Drawing Sheets

(56) References Cited

OTHER PUBLICATIONS

Samsung, "Cross-Carrier Scheduling of PUSCH for TDD CA", R1-120160, 3GPP TSG RAN WG1 #68, Feb. 6-10, 2012, 3 pages.

Huawei, HiSilicon, "Cross-Carrier Scheduling Design for TDD Inter-Band CA with Different UL-DL Configurations", R1-113634, 3GPP TSG RAN WG1 Meeting #67, Nov. 14-18, 2011.
European Search Report dated Dec. 3, 2015 issued in counterpart application No. 13761097.8-1851, 11 pages.

* cited by examiner

PHYSICAL DOWNLINK SHARED CHANNEL TRANSMISSION METHOD

PRIORITY

This application claims priority under 35 U.S.C. §119(a) to Chinese Application Serial No. 201210071047.8, which was filed in the Chinese Intellectual Property Office on Mar. 16, 2012, the entire content of which is incorporated herein by reference.

BACKGROUND OF THE INVENTION

1. Field of the Invention

The present invention generally relates to wireless communication systems, and more particularly, to a Physical Downlink Shared CHannel (PDSCH) data transmission method.

2. Description of the Related Art

Figure 1:
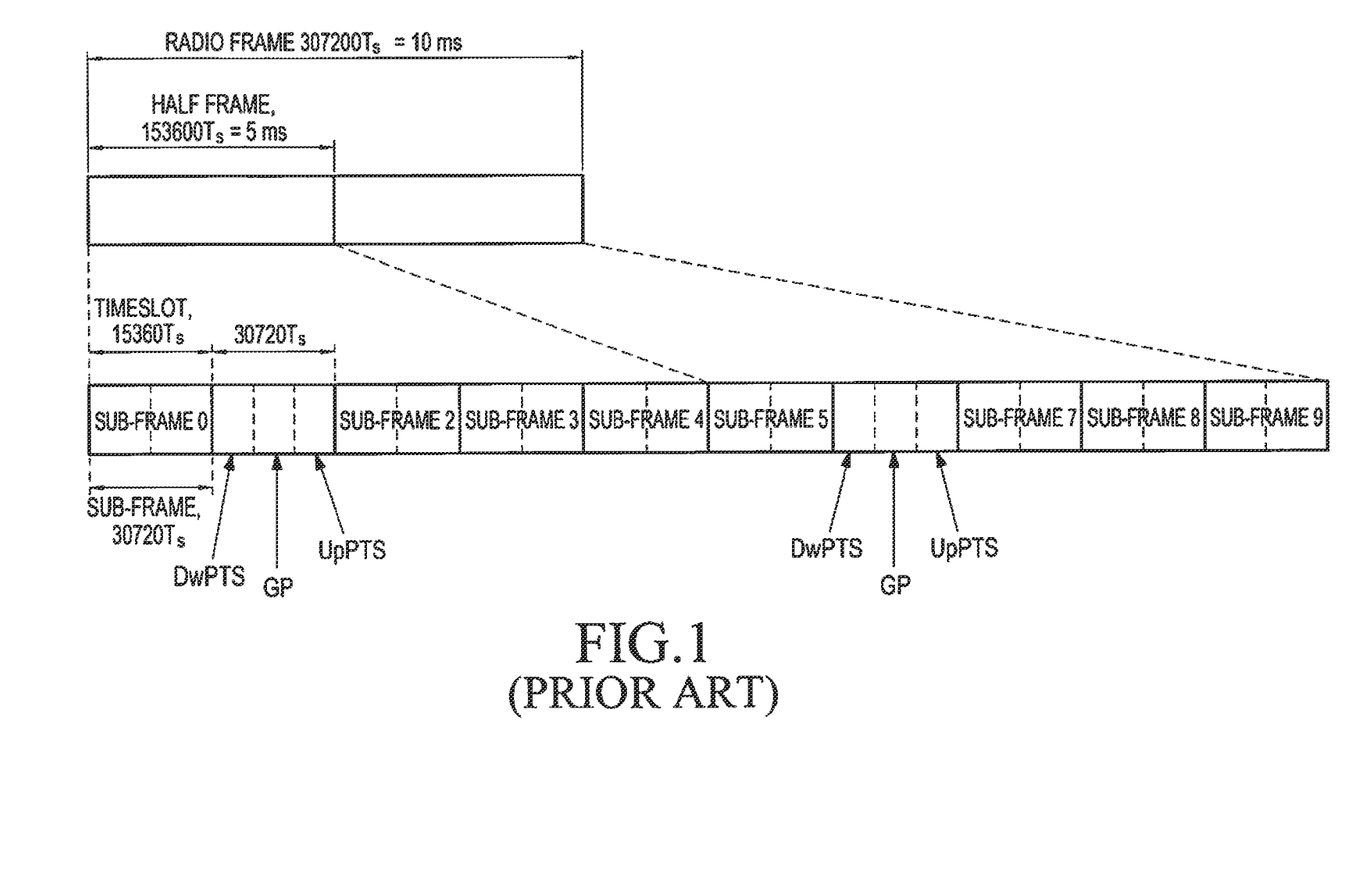
FIG. 1 is a schematic diagram illustrating a structure of a frame in an existing TDD system.

A Long Term Evolution (LTE) system supports a Frequency Division Duplexing (FDD) mode and a Time Division Duplexing (TDD) mode. FIG. 1 is a schematic diagram illustrating the structure of a frame in a TDD system. The length of each radio frame is 10 ms, with each radio frame divided into two half-frames of a length of 5 ms. Each half-frame consists of eight data time slots, each of which having a length of 0.5 ms, and three special time slots, i.e., Downlink Pilot Time Slot (DwPTS), Guard Period (GP) and Uplink Pilot Time Slot (UpPTS). The entire length of the three special time slots is 1 ms. Each sub-frame consists of two continuous time slots, that is, the kth sub-frame includes time slot 2k and time slot 2k+1.

The TDD system supports seven different uplink and downlink configurations. As shown in Table 1, D denotes a downlink sub-frame, U denotes an uplink sub-frame, and S denotes a special sub-frame consisting of the above mentioned three special time slots.

TABLE 1

| Config- uration number | switching point cycle | Sub-frame number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 10 ms | D | S | U | U | U | D | S | U | U | D |

In order to increase the user's transmission rate, the LTE-Advanced (LTE-A) system of the LTE system has been introduced. In the LTE-A system, a wider bandwidth is obtained by aggregating multiple Component Carriers (CCs), i.e., through Carrier Aggregation (CA), and constitutes the uplink and downlink of a communication system to support the higher transmission rate. For instance, 100 MHz bandwidth may be obtained by aggregating five 20 MHz CCs. Here, each CC is called a cell. For a User Equipment (UE), a base station may configure the UE to work in multiple Cells, one of which is the Primary Cell (PCC or Pcell), and the others are called Secondary Cells (SCC or Scell).

According to a requirement in the LTE-A TDD system, multiple cells aggregated together adopt the same uplink and downlink configuration.

However, when the distance in the frequency domain among multiple cells on which Carrier Aggregation will be performed is large enough, these cells may adopt different TDD uplink and downlink configurations without interfering with each other. In addition, in some cases, an adjacent channel of each cell may have been deployed in a different uplink and downlink configuration (for example, the adjacent channel has different Time Division-Synchronous Code Division Multiple Access (TD-SCDMA) configuration). At this point, if these cells continue to adopt the same TDD uplink and downlink configuration, serious adjacent channel interference will be generated. Therefore, in subsequent studies of LTE-A, an important issue is how to effectively support the multiple cells on which Carrier Aggregation will be performed, wherein the multiple cells have different TDD uplink and downlink configurations.

Figure 2:
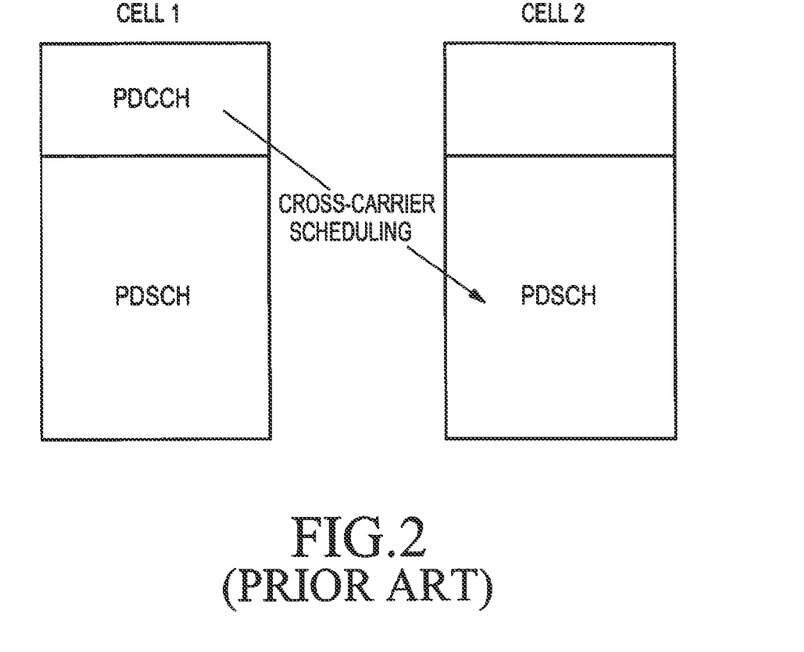
FIG. 2 is a schematic diagram illustrating two cells for implementing cross-carrier scheduling.

In order to protect controlling signals under a Heterogeneous Network (Het-Net) scene, cross-carrier scheduling mode has been introduced. The cross-carrier scheduling refers to PDSCH data transmission in a cell that is scheduled by a Physical Downlink Control CHannel (PDCCH) sent in another cell. As shown in FIG. 2, PDCCH in cell1 schedules PDSCH data in cell2. Thus, when serious interference exists in cell2, a control channel of cell2 may be transmitted in cell1, so the control channel of cell2 is protected. The cell sending the PDCCH is known as a cell for scheduling, and the cell sending the PDSCH is known as a cell being scheduled.

According to the requirements in current 3GPP version 10, the cross-carrier scheduling of PDSCH refers to a PDCCH of a cell for scheduling a PDSCH of a cell being scheduled of which a sub-frame is the same as that of the PDCCH. Thus, when the TDD uplink and downlink configuration of the cell for scheduling is different from that of the cell being scheduled, especially when the downlink sub-frames of the cell being scheduled is not in a set of downlink sub-frames of the cell for scheduling, PDSCHs in part of downlink sub-frames of the cell being scheduled will be unable to be scheduled in cross-carrier manner due to the TDD uplink and downlink configuration of the part of downlink sub-frames that is different from that of the downlink sub-frames of the cell for scheduling.

Figure 3:
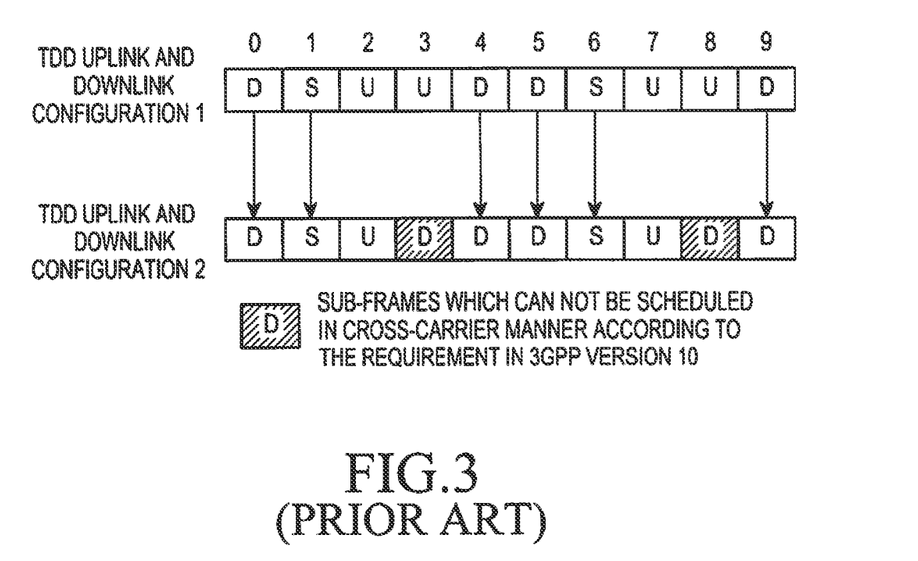
FIG. 3 is a schematic diagram illustrating two cells adopting a different TDD uplink and downlink configuration.

FIG. 3 is a schematic diagram illustrating two cells adopting different TDD uplink and downlink configurations. In FIG. 3, the upper part is a schematic diagram illustrating a TDD uplink and downlink configuration of the cell for scheduling, and the lower part is schematic diagram illustrating TDD uplink and downlink configuration of the cell being scheduled. As can be seen from FIG. 3, according to above mentioned cross-carrier scheduling principle, sub-frame 3 and sub-frame 8 of the cell for scheduling can not schedule downlink sub-frame 3 and sub-frame 8 of the cell being scheduled in cross-carrier manner due to sub-frame 3 and sub-frame 8 of the cell for scheduling being uplink sub-frames.

As can be seen, when the existing PDSCH cross-carrier scheduling method is adopted to implement the PDSCH transmission, it may cause a problem in that PDSCHs in part of the sub-frames can not be scheduled. Thus, the peak rate of a terminal user is affected, and a requirement for higher throughput of the terminal user can not be satisfied.

SUMMARY OF THE INVENTION

The present invention has been made to address at least the problems and disadvantages described above, and to provide at least the advantages described below. Accordingly, aspects of the present invention provide a PDSCH transmission method, which can increase the peak rate and system throughput of the terminal user.

According to an aspect of the present invention, a PDSCH data transmission method is provided, which includes receiving, by a User Equipment (UE), cross-carrier scheduling information in a PDCCH of a cell for scheduling, the cross-carrier scheduling information carrying scheduling information indicating at least one PDSCH in at least one sub-frame of a cell being scheduled in the cross-carrier scheduling processing, by the UE, data of at least one PDSCH corresponding to the indication according to received cross-carrier scheduling information; and sending, by the UE, a Hybrid Automatic Repeat reQuest Acknowledgement (HARQ-ACK) message to a base station according to the processed result.

In the PDSCH transmission method according to aspects of the present invention, when performing cross-carrier scheduling, the base station utilizes a PDCCH of a cell for scheduling to send scheduling information for indication at least one PDSCH in at least one sub-frame of a cell being scheduled in cross-carrier scheduling to a UE, and the UE obtains PDSCH data to be processed according to the scheduling information. Thus the flexibility of cross-carrier scheduling may be enhanced. When PDSCH data is scheduled in cross-carrier manner, there are more downlink sub-frames capable of being scheduled in the cell being scheduled of a terminal user. Thus the peak rate of the terminal user may be increased, and the requirement for higher throughput of the terminal user can be satisfied.

BRIEF DESCRIPTION OF THE DRAWINGS

The above and other aspects, features, and advantages of the present invention will be more apparent from the following detailed description taken in conjunction with the accompanying drawings, in which.

DETAILED DESCRIPTION OF EMBODIMENTS OF THE PRESENT INVENTION

Hereinafter, various embodiments of the present invention will be described with reference to the accompanying drawings. In the following description of the present invention, a detailed description of known functions and configurations incorporated herein will be omitted when it may obscure the subject matter of the present invention.

For a TDD system configured with carrier aggregation, in the present invention, TDD uplink and downlink configurations of multiple cells of a base station may be different. Similar to LTE-A, it is possible to configure a UE accessing the base station to work in at least one cell.

When sending cross-carrier scheduling information to a UE utilizing a PDCCH of a cell for scheduling, a base station also indicates a PDSCH of a cell being scheduled using the cross-carrier scheduling information, and the UE may determine PDSCH data in which sub-frames should be processed according to the indication. Thus, when cross-carrier scheduling is implemented, the scheduling of a PDSCH in the cell being scheduled will not be limited due to the flexibility of indication information; that is, only when a sub-frame in the cell for scheduling is the same as a sub-frame in which a PDSCH of the cell being scheduled is located is downlink sub-frame. In the present invention, a PDCCH in the cell for scheduling may be used to schedule the PDSCH of the cell being scheduled. Thus, it may be guaranteed that when cells in a CA system are configured with different TDD uplink and downlink configurations and PDSCH data is scheduled in cross-carrier manner, the cell being scheduled of a UE has more downlink sub-frames capable of being scheduled. Subsequently, the peak rate of the UE may be increased, and the requirement for higher throughput of the UE may be satisfied.

Figure 4:
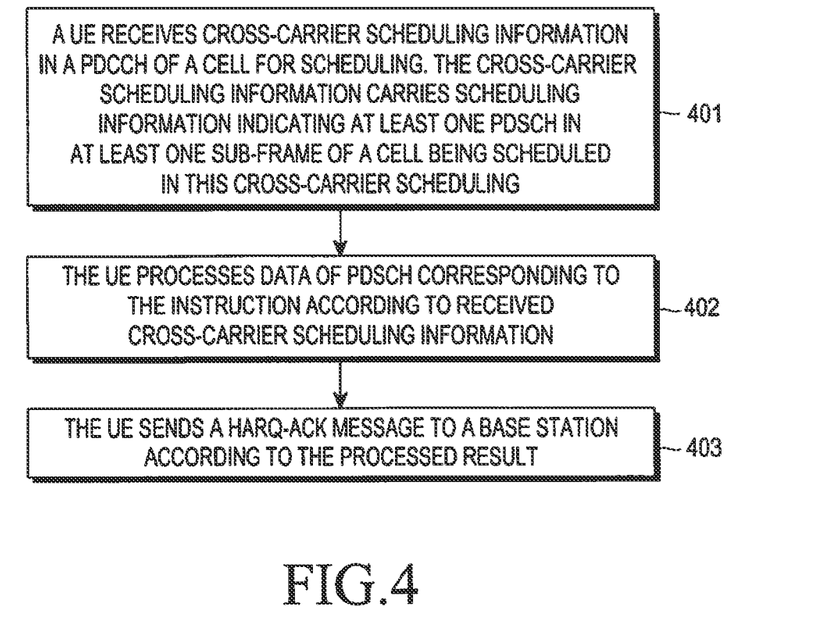
FIG. 4 is a flowchart illustrating a PDSCH transmission method according to an embodiment of the present invention.

FIG. 4 is a flowchart illustrating a PDSCH transmission method according to an embodiment of the present invention. As shown in FIG. 4, in step 401, a UE receives cross-carrier scheduling information in a PDCCH of a cell for scheduling, in which the cross-carrier scheduling information carries scheduling information indicating at least one PDSCH in at least one sub-frame of a cell being scheduled in the cross-carrier scheduling.

The difference between step 401 and an existing cross-carrier scheduling PDSCH method is, when cross-carrier scheduling information is sent utilizing the PDCCH, it is required to carry information for indicating the PDSCH in the cell being scheduled in the cross-carrier scheduling information. Thus, it is possible to dynamically and flexibly indicate the PDSCH corresponding to cross-carrier scheduling in the present invention without limiting the corresponding relation between the PDCCH of the cell for scheduling and the PDSCH of the cell being scheduled to the same sub-frame. Correspondingly, it is possible to schedule one or more PDSCHs each time cross-carrier scheduling is performed, which may be one PDSCH in one sub-frame or multiple PDSCHs in multiple sub-frames. However, only one PDSCH can be scheduled in the existing method.

In addition, when the sub-frames in the cell for scheduling which are the same as sub-frames in which a PDSCH of the cell being scheduled is located are uplink sub-frames, according to the indication which indicates PDSCH corresponding to the scheduling in cross-carrier scheduling information, it is possible to utilize a PDCCH in other downlink sub-frames in the cell for scheduling to implement the scheduling for a PDSCH of the cell being scheduled. Therefore, the above method for carrying scheduling information for the indication increases the peak rate of the terminal user, and satisfies the requirement of higher throughput of the terminal user.

In order to increase the peak rate of the terminal user, and satisfy the requirement of higher throughput of the terminal user, it is required for the corresponding relation between the PDCCH of the cell for scheduling and the PDSCH of the cell being scheduled to meet the following. A PDSCH in a downlink sub-frame of the cell being scheduled can only be scheduled in cross-carrier manner by a PDCCH in a downlink sub-frame of the cell for scheduling, which is in the downlink association set of the cell being scheduled.

Here, the concept of a downlink association set is introduced. The downlink association set is determined by the HARQ-ACK timing relation in the existing system. Thus, when the downlink association set is used to determine the PDCCH for cross-carrier scheduling, the corresponding relation between the PDCCH performing the cross-carrier scheduling and the PDSCH to be scheduled will no longer be limited to the same downlink sub-frame. Consequently, PDSCH scheduling may be more flexible, the number of PDSCHs capable of being scheduled in the cross-carrier manner may be increased, and peak rate of the UE may be increased. In addition, because the downlink association set exists in the existing system, no extra corresponding notification is needed, which reduces the complexity of implementing the present invention, and facilitates the implementation of the present invention.

In a practical application, the definition of "downlink association set" may be the same as that of a downlink association set in non cross-carrier scheduling in the existing system. Namely, the downlink association set may be determined by the HARQ-ACK timing relation of a PDSCH of the UE in non cross-carrier scheduling.

According to the HARQ-ACK timing relation described in existing standards, the set of downlink sub-frames of which HARQ-ACK feedback information are sent in the same uplink sub-frame is shown in Table 2. In the TDD uplink and downlink configuration 1, HARQ-ACK feedback information of downlink sub-frames n−7 and n−6 are sent in the uplink sub-frame n=2 of the radio frame k. The set consisting of downlink sub-frames n−7 and n−6 is the above mentioned downlink association set.

TABLE 2

LTE TDD uplink and downlink configurations

| UL-DL Configuration | Subframe n | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | — | 4 | — | — | 6 | — | 4 |
| 1 | — | — | 7, 6 | 4 | — | — | — | 7, 6 | 4 | — |
| 2 | — | — | 8, 7, 4, 6 | — | — | — | — | 8, 7, 4, 6 | — | — |
| 3 | — | — | 7, 6, 11 | 6, 5 | 5, 4 | — | — | — | — | — |
| 4 | — | — | 12, 8, 7, 11 | 6, 5, 4, 7 | — | — | — | — | — | — |
| 5 | — | — | 13, 12, 9, 8, 7, 5, 4, 11, 6 | — | — | — | — | — | — | — |
| 6 | — | — | 7 | 7 | 5 | — | — | 7 | 7 | — |

For example, a base station configures two cells for a CA UE, one of which is the primary cell and the other is the secondary cell. The primary cell adopts the TDD uplink and downlink configuration 1, and the secondary cell adopts the TDD uplink and downlink configuration 2. In non cross-carrier scheduling, suppose the primary cell complies with the HARQ-ACK timing relation of the TDD uplink and downlink configuration 1, and the secondary cell complies with the HARQ-ACK timing relation of the TDD uplink and downlink configuration 2. In the cross-carrier scheduling of the present invention, suppose the primary cell complies with the HARQ-ACK timing relation of the TDD uplink and downlink configuration 1, and the secondary cell complies with the HARQ-ACK timing relation of the TDD uplink and downlink configuration 2.

In a practical application, the downlink association set may also be determined by a preset HARQ-ACK timing relation of the PDSCH of the cell being scheduled and specially used in cross-carrier scheduling. Specifically, the HARQ-ACK timing relation may be set by persons skilled in the art according to practical demands.

A specific implementation of that the corresponding relation between the PDCCH of the cell for scheduling and the PDSCH of the cell being scheduled needs to meet "a PDSCH in a downlink sub-frame of the cell being scheduled can only be scheduled in cross-carrier manner by a PDCCH in a downlink sub-frame of the cell for scheduling which is in the downlink association set of the cell being scheduled" will be described with an application.

Figure 5:
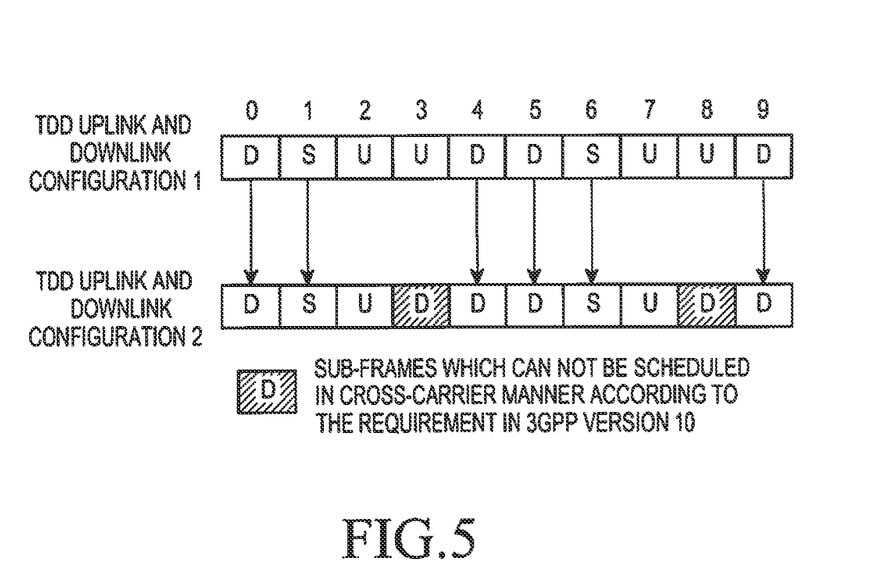
FIG. 5 is a schematic diagram illustrating an application of cross-carrier scheduling according to an embodiment of the present invention.

For example, a base station configures two cells for a CA UE, one of which is the primary cell and the other is the secondary cell. The primary cell adopts the TDD uplink and downlink configuration 1, and the secondary cell adopts the TDD uplink and downlink configuration 2. The primary cell is to schedule the secondary cell in a cross-carrier manner, so the primary cell is the cell for scheduling, and the secondary cell is the cell being scheduled. As shown in FIG. 5, a downlink association set of the cell being scheduled is {sub-frame 9, sub-frame 0, sub-frame 1, sub-frame 3}, the downlink sub-frames of the cell for scheduling which are included in the downlink association set {sub-frame 9, sub-frame 0, sub-frame 1, sub-frame 3} of the cell being scheduled include {sub-frame 9, sub-frame 0, sub-frame 1}, so PDCCHs in {sub-frame 9, sub-frame 0, sub-frame 1} of the cell for scheduling may schedule the {sub-frame 9, sub-frame 0, sub-frame 1, sub-frame 3} of the cell being scheduled in a cross-carrier manner.

Preferably, the corresponding relation between the PDCCH and the PDSCH may further meet the following.

For a sub-frame, if the sub-frame is a downlink sub-frame in both the cell being scheduled and the cell for scheduling, then a PDSCH in the sub-frame of the cell being scheduled is scheduled in a cross-carrier manner by a PDCCH in the sub-frame of the cell for scheduling.

Figure 6:
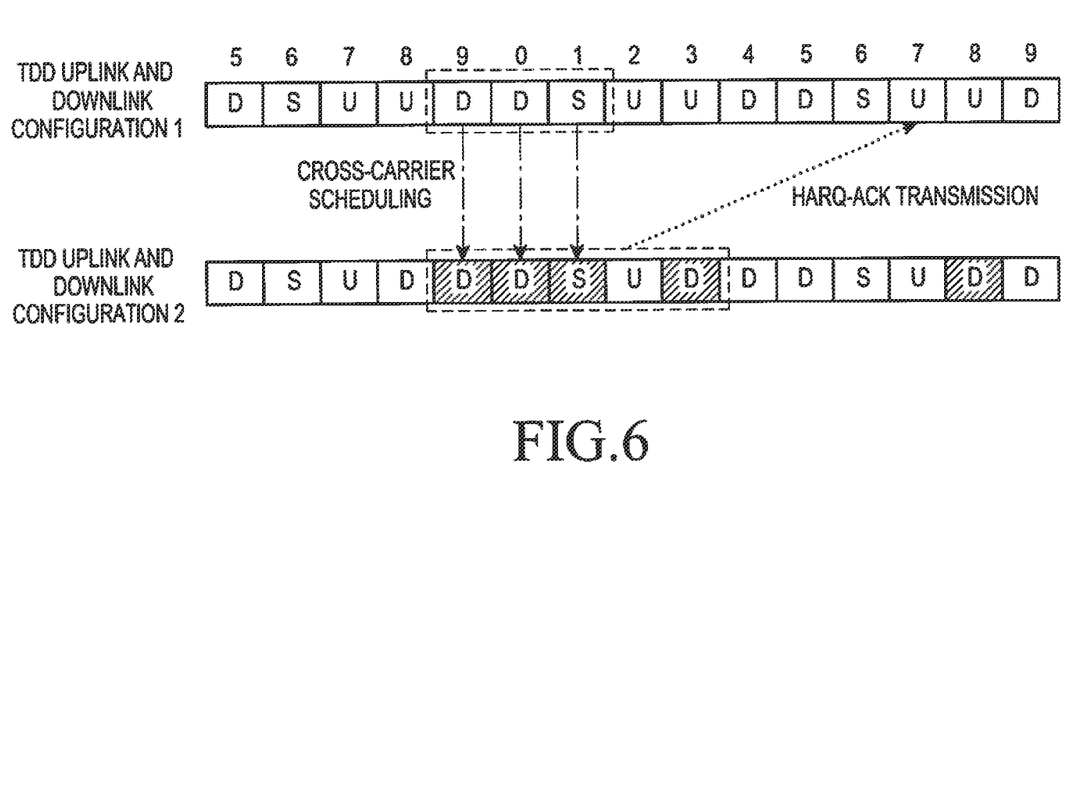
FIG. 6 is a schematic diagram illustrating cross-carrier scheduling of the same sub-frames according to an embodiment of the present invention.

For example, a base station configures two cells for a CA UE, one of which is the primary cell and the other is the secondary cell. The primary cell adopts the TDD uplink and downlink configuration 1, and the secondary cell adopts the TDD uplink and downlink configuration 2. The primary cell is to schedule the secondary cell in a cross-carrier manner, so the primary cell is the cell for scheduling, and the secondary cell is the cell being scheduled. As shown in FIG. 6, a downlink association set of the cell being scheduled is {sub-frame 9, sub-frame 0, sub-frame 1, sub-frame 3}, the downlink sub-frames of the cell for scheduling which are included in the downlink association set {sub-frame 9, sub-frame 0, sub-frame 1, sub-frame 3} of the cell being scheduled include {sub-frame 9, sub-frame 0, sub-frame 1}, so a PDCCH in sub-frame 9 of the cell for scheduling may schedule the sub-frame 9 of the cell being scheduled in a cross-carrier manner, a PDCCH in sub-frame 0 of the cell for scheduling may schedule the sub-frame 0 of the cell being scheduled in a cross-carrier manner, and a PDCCH in sub-frame 1 of the cell for scheduling may schedule the sub-frame 1 of the cell being scheduled in a cross-carrier manner.

Preferably, the corresponding relation between the PDCCH and the PDSCH may further meet the following.

For a sub-frame, if the sub-frame is a downlink sub-frame in the cell being scheduled, and is an uplink sub-frame in the cell for scheduling, then a PDSCH in the downlink sub-frame of the cell being scheduled is scheduled in a cross-carrier manner by a PDCCH in a downlink sub-frame of the cell for scheduling which is in the downlink association set and located before the downlink sub-frame of the cell being scheduled.

Figure 7:
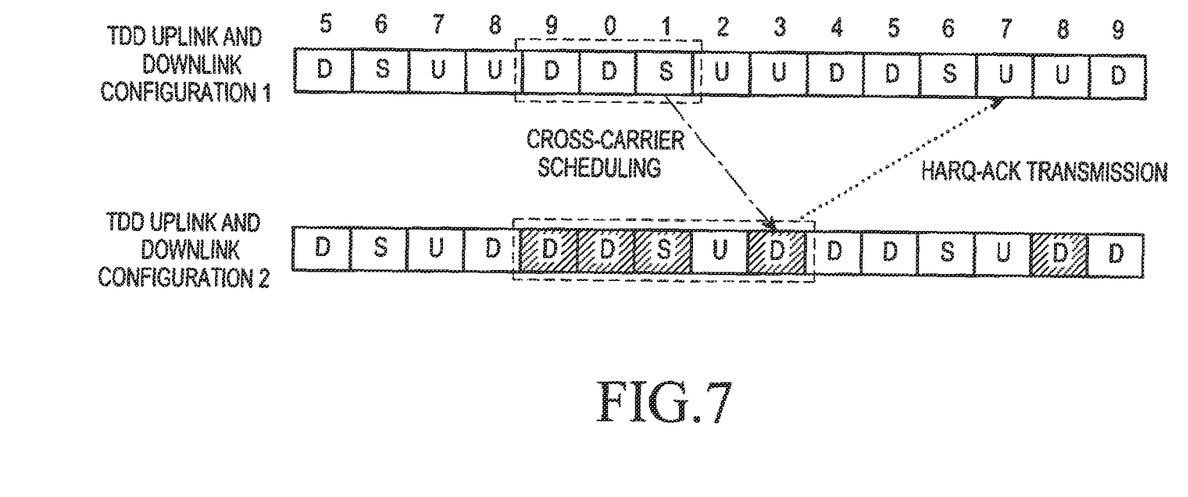
FIG. 7 is a schematic diagram illustrating cross-carrier scheduling of different sub-frames according to an embodiment of the present invention.

For example, a base station configures two cells for a CA UE, one of which is the primary cell and the other is the secondary cell. The primary cell adopts the TDD uplink and downlink configuration 1, and the secondary cell adopts the TDD uplink and downlink configuration 2. The primary cell is to schedule the secondary cell in a cross-carrier manner, so the primary cell is the cell for scheduling, and the secondary cell is the cell being scheduled. As shown in FIG. 7, a downlink association set of the cell being scheduled is {sub-frame 9, sub-frame 0, sub-frame 1, sub-frame 3}, the downlink sub-frames of the cell for scheduling which are included in the downlink association set {sub-frame 9, sub-frame 0, sub-frame 1, sub-frame 3} of the cell being scheduled include {sub-frame 9, sub-frame 0, sub-frame 1}, the sub-frame 3 of the cell being scheduled is a downlink sub-frame, and the sub-frame 3 of the cell for scheduling is a uplink sub-frame, so the sub-frame 3 is scheduled in a cross-carrier manner by a downlink sub-frame, namely, the downlink sub-frame 1 of the cell for scheduling which is in the downlink association set {sub-frame 9, sub-frame 0, sub-frame 1, sub-frame 3}, located before the downlink sub-frame 3 and is the nearest one to the downlink sub-frame 3 of the cell being scheduled.

Preferably, the corresponding relation between the PDCCH and the PDSCH may further meet the following.

For a sub-frame, if the sub-frame is a downlink sub-frame in the cell being scheduled, and is an uplink sub-frame in the cell for scheduling, and there is no downlink sub-frame in the cell for scheduling which is in the downlink association set and located before the downlink sub-frame of the cell being scheduled, then a PDSCH in the downlink sub-frame of the cell being scheduled will not be scheduled in a cross-carrier manner.

Figure 8:
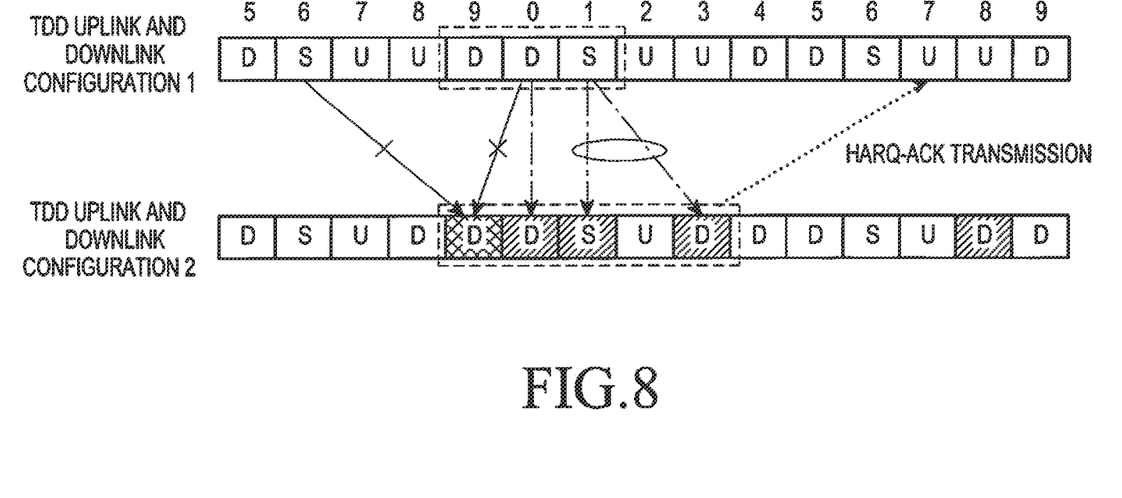
FIG. 8 is a schematic diagram illustrating an application that is not capable of implementing cross-carrier scheduling according to the embodiment of the present invention.

For example, a base station configures two cells for a CA UE, one of which is the primary cell and the other is the secondary cell. The primary cell adopts the TDD uplink and downlink configuration 1, and the secondary cell adopts the TDD uplink and downlink configuration 2. The primary cell is to schedule the secondary cell in a cross-carrier manner, so the primary cell is the cell for scheduling, and the secondary cell is the cell being scheduled. As shown in FIG. 8, a downlink association set of the cell being scheduled is {sub-frame 9, sub-frame 0, sub-frame 1, sub-frame 3}, the downlink sub-frames of the cell for scheduling which are included in the downlink association set {sub-frame 9, sub-frame 0, sub-frame 1, sub-frame 3} of the cell being scheduled include {sub-frame 0, sub-frame 1}, so a PDCCH in sub-frame 0 of the cell for scheduling may schedule sub-frame 0 of the cell being scheduled in a cross-carrier manner, a PDCCH in sub-frame 1 of the cell for scheduling may schedule sub-frames 1 and 3 of the cell being scheduled in a cross-carrier manner, respectively or together. For sub-frame 9 of the cell being scheduled, because the sub-frame 9 of the cell for scheduling is an uplink sub-frame, and the downlink sub-frames in the cell for scheduling included in the downlink association set {sub-frame 9, sub-frame 0, sub-frame 1, sub-frame 3} of the cell being scheduled are {sub-frame 0, sub-frame 1} which are not located before the downlink sub-frame 9, the downlink sub-frame 9 of the cell being scheduled will not be scheduled in a cross-carrier manner.

A PDCCH in a downlink sub-frame of the cell for scheduling may schedule in a cross-carrier manner at least one PDSCH in at least one downlink sub-frame of the cell being schedule.

Figure 9:
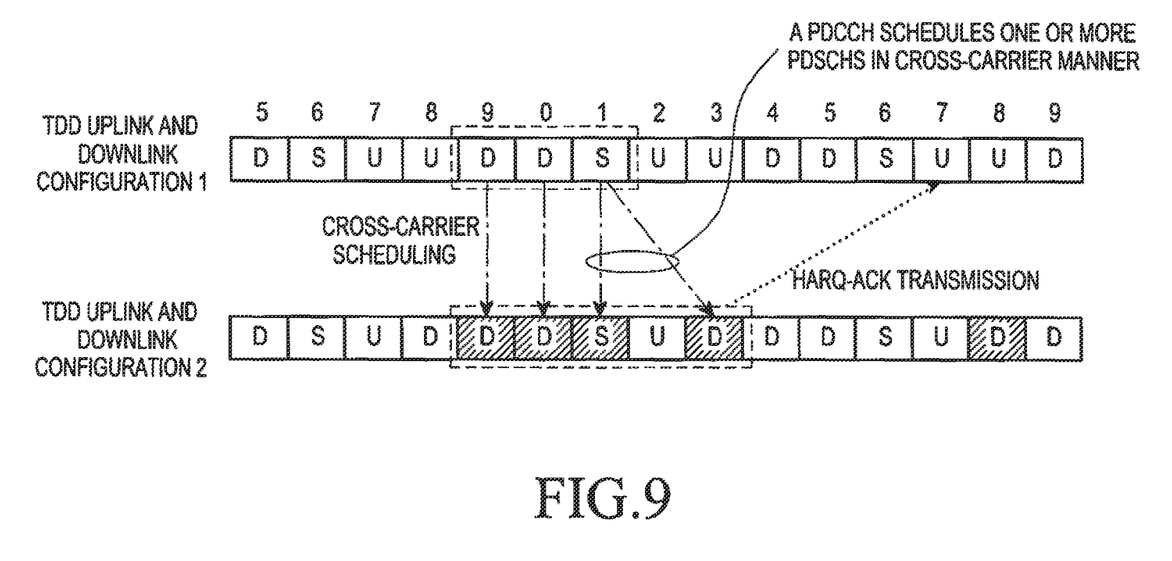
FIG. 9 is a schematic diagram illustrating an application that a PDCCH may schedule multiple PDSCHs in cross-carrier manner according to the embodiment of the present invention.

For example, a base station configures two cells for a CA UE, one of which is the primary cell and the other is the secondary cell. The primary cell adopts the TDD uplink and downlink configuration 1, and the secondary cell adopts the TDD uplink and downlink configuration 2. The primary cell is to schedule the secondary cell in a cross-carrier manner, so the primary cell is the cell for scheduling, and the secondary cell is the cell being scheduled. As shown in FIG. 9, a downlink association set of the cell being scheduled is {sub-frame 9, sub-frame 0, sub-frame 1, sub-frame 3}, the downlink sub-frames of the cell for scheduling which are included in the downlink association set {sub-frame 9, sub-frame 0, sub-frame 1, sub-frame 3} of the cell being scheduled include {sub-frame 9, sub-frame 0, sub-frame 1}, so a PDCCH in sub-frame 9 of the cell for scheduling may schedule in a cross-carrier manner sub-frame 9 of the cell being scheduled, a PDCCH in sub-frame 0 of the cell for scheduling may schedule in a cross-carrier manner sub-frame 0 of the cell being scheduled, and a PDCCH in sub-frame 1 of the cell for scheduling may schedule in a cross-carrier manner sub-frames 1 and 3 of the cell being scheduled, respectively or together.

It is possible to carry scheduling information for indicating a PDSCH of the cell being scheduled in this cross-carrier scheduling according to the following four methods.

Method one: a Downlink Assignation Indicator (DAI) in the PDCCH is used to carry the scheduling information for the indication.

Here, a PDSCH in a sub-frame to be scheduled of the cell being scheduled in this cross-carrier scheduling is indicated by redefining a value of the DAI in the PDCCH. A DAI in the existing system is used to indicate a sub-frame in which a PDCCH scheduled in cross-carrier scheduling is located which is the scheduled downlink sub-frame. A specific implementation for using a redefined DAI to carry the scheduling information for the indication will be now described in detail with an example.

For example, a base station configures two cells for a CA UE, one of which is the primary cell and the other is the secondary cell. The primary cell adopts the TDD uplink and downlink configuration 1, and the secondary cell adopts the TDD uplink and downlink configuration 2. The primary cell is to schedule the secondary cell in a cross-carrier manner, so the primary cell is the cell for scheduling, and the secondary cell is the cell being scheduled. As shown in FIG. 9, a downlink association set of the cell being scheduled is {sub-frame 9, sub-frame 0, sub-frame 1, sub-frame 3}, the downlink sub-frames of the cell for scheduling which are included in the downlink association set {sub-frame 9, sub-frame 0, sub-frame 1, sub-frame 3} of the cell being scheduled include {sub-frame 9, sub-frame 0, sub-frame 1}, so a PDCCH in sub-frame 9 of the cell for scheduling may schedule in a cross-carrier manner sub-frame 9 of the cell being scheduled, a PDCCH in sub-frame 0 of the cell for scheduling may schedule in a cross-carrier manner sub-frame 0 of the cell being scheduled, and a PDCCH in sub-frame 1 of the cell for scheduling may schedule in a cross-carrier manner sub-frames 1 and 3 of the cell being scheduled, respectively or together.

When the PDCCH in sub-frame 0 of the cell for scheduling schedules the cell being scheduled in a cross-carrier manner, and the DAI=1, the sub-frame 1 of the cell being scheduled is scheduled in a cross-carrier manner by the cell for scheduling, and the downlink sub-frame 1 is the first scheduled downlink sub-frame in the downlink association set {sub-frame 9, sub-frame 0, sub-frame 1, sub-frame 3}. When the PDCCH in sub-frame 0 of the cell for scheduling schedules the cell being scheduled in a cross-carrier manner, and the DAI=2, the sub-frame 1 of the cell being scheduled is scheduled in a cross-carrier manner by the cell for scheduling, and the downlink sub-frame 1 is the second scheduled downlink sub-frame in the downlink association set {sub-frame 9, sub-frame 0, sub-frame 1, sub-frame 3}. When the PDCCH in sub-frame 0 of the cell for scheduling schedules the cell being scheduled in a cross-carrier manner, and the DAI=3, the sub-frame 1 of the cell being scheduled is scheduled in a cross-carrier manner by the cell for scheduling, and the downlink sub-frame 1 is the third scheduled downlink sub-frame in the downlink association set {sub-frame 9, sub-frame 0, sub-frame 1, sub-frame 3}. When the PDCCH in sub-frame 0 of the cell for scheduling schedules the cell being scheduled in a cross-carrier manner, and the DAI=4, the sub-frame 1 and the sub-frame 3 of the cell being scheduled are scheduled in a cross-carrier manner by the cell for scheduling, and the downlink sub-frame 1 is the third scheduled downlink sub-frame in the downlink association set {sub-frame 9, sub-frame 0, sub-frame 1, sub-frame 3}, the downlink sub-frame 3 is the fourth scheduled downlink sub-frame in the downlink association set {sub-frame 9, sub-frame 0, sub-frame 1, sub-frame 3}.

Method two: a Carrier Indicator Field (CIF) in the PDCCH is used to carry the scheduling information for the indication.

Here, a set of sub-frames to be scheduled in a cross-carrier manner of the cell being scheduled in this cross-carrier scheduling is indicated by redefining a code of the CIF in the PDCCH. The set of sub-frames may consist of one single downlink sub-frame, or multiple downlink sub-frames.

Method three: the DAI and the CIF in the PDCCH are used to carry together the scheduling information for the indication.

Here, a set of sub-frames to be scheduled in a cross-carrier manner of the cell being scheduled in this cross-carrier scheduling is indicated by performing a combination coding on both values of the DAI and CIF in the PDCCH. The set of sub-frames may consist of one single downlink sub-frame, or multiple downlink sub-frames.

Method four: a padding bit and a preset new bit in the PDCCH are used to carry together the scheduling information for the indication.

Here, a set of sub-frames to be scheduled in a cross-carrier manner of the cell being scheduled in this cross-carrier scheduling is indicated by a padding bit and a preset new bit in the PDCCH. The set of sub-frames may consist of one single downlink sub-frame, or multiple downlink sub-frames.

Referring back to FIG. 4 in step 402, the UE processes data of the PDSCH corresponding to the instruction according to received cross-carrier scheduling information.

Here, different from the existing method, UE determines PDSCH data to be processed according to scheduling information for the instruction carried in the cross-carrier scheduling information. Since the specific data processing method is known by persons skilled in the art, no further descriptions will be provided hereinafter.

In step 403, the UE sends a HARQ-ACK message to a base station according to the processed result.

Since the specific implementation of step 403 is the same as that in the existing system, no further descriptions will be provided hereinafter.

It can be seen from the above that the PDSCH transmission method provided by the present invention guarantees that when cells in the CA system are configured with different TDD uplink and downlink configurations and cross-carrier scheduling is performed, the cell being scheduled of a UE has more downlink sub-frames capable of being scheduled. Thus, the peak rate of the UE is increased, and the throughput of the UE in the CA system in which multiple cells are configured with different TDD uplink and downlink configurations is enhanced. Therefore, the requirement for higher throughput of a user is satisfied.

In summary, the foregoing description provides embodiments of the present invention and is not used for limiting the protection scope thereof. Any modification, equivalent substitution, or improvement made without departing from the spirit and principle of the present invention should be covered by the protection scope of the following claims of the present invention.

What is claimed:

1. A method for transmitting physical downlink shared channel (PDSCH) data, the method comprising:
   receiving, by a user equipment (UE), cross-carrier scheduling information in a physical downlink control channel (PDCCH) of a cell for scheduling, the cross-carrier scheduling information carrying scheduling information indicating at least one PDSCH in at least one sub-frame of a cell being scheduled in cross-carrier scheduling;
   processing, by the UE, data of the at least one PDSCH related to the indication based on the received cross-carrier scheduling information, wherein a corresponding relation between the PDCCH and the PDSCH satisfies a PDSCH in a downlink sub-frame of the cell being scheduled is exclusively cross-carrier scheduled by a PDCCH in a downlink sub-frame of the cell for scheduling, the PDSCH in the downlink sub-frame of the cell being scheduled is included in a downlink association set of the cell being scheduled, and the downlink association set includes a plurality of downlink sub-frames determined by a hybrid automatic repeat request acknowledgement (HARQ-ACK) timing relation; and
   transmitting, by the UE, a HARQ-ACK message to a base station based on the processed result.

2. The method according to claim 1, wherein the corresponding relation between the PDCCH and the PDSCH further satisfies:
   for a sub-frame, if the sub-frame is a downlink sub-frame in both the cell being scheduled and the cell for scheduling, then the PDSCH in the downlink sub-frame of the cell being scheduled is cross-carrier scheduled by the PDCCH in the downlink sub-frame of the cell for scheduling.

3. The method according to claim 1, wherein the corresponding relation between the PDCCH and the PDSCH further satisfies:
   for a sub-frame, if the sub-frame is a downlink sub-frame in the cell being scheduled, and is an uplink sub-frame in the cell for scheduling, then the PDSCH in the downlink sub-frame of the cell being scheduled is cross-carrier scheduled by the PDCCH in the downlink sub-frame of the cell for scheduling, which is in the downlink association set and located before the downlink sub-frame of the cell being scheduled.

4. The method according to claim 1, wherein the corresponding relation between the PDCCH and the PDSCH further satisfies:
   for a sub-frame, if the sub-frame is a downlink sub-frame in the cell being scheduled, and is an uplink sub-frame in the cell for scheduling, then the PDSCH in the downlink sub-frame of the cell being scheduled is cross-carrier scheduled by the PDCCH in the downlink sub-frame of the cell for scheduling, which is in the downlink association set, located before the downlink sub-frame and is the nearest one to the downlink sub-frame of the cell being scheduled.

5. The method according to claim 1, wherein the corresponding relation between the PDCCH and the PDSCH further satisfies:

for a sub-frame, if the sub-frame is a downlink sub-frame in the cell being scheduled, and is an uplink sub-frame in the cell for scheduling, and there is no downlink sub-frame in the cell for scheduling which is in the downlink association set and located before the downlink sub-frame of the cell being scheduled, then the PDSCH in the downlink sub-frame of the cell being scheduled will not be cross-carrier scheduled.

6. The method according to claim 1, wherein the downlink association set is determined by a HARQ-ACK timing relation of a PDSCH of the UE in non cross-carrier scheduling, or is determined by a preset HARQ-ACK timing relation of the PDSCH of the cell being scheduled and specially used in cross-carrier scheduling.

7. The method according to claim 1, wherein the cross-carrier scheduling information carries the scheduling information by utilizing a downlink assignation indicator (DAI) in the PDCCH to carry the scheduling information for the indication.

8. The method according to claim 1, wherein the cross-carrier scheduling information carries the scheduling information by utilizing a carrier indicator field (CIF) in the PDCCH to carry the scheduling information for the indication.

9. The method according to claim 1, wherein the cross-carrier scheduling information carries the scheduling information by utilizing a downlink assignation indicator (DAI) and a carrier indicator field (CIF) in the PDCCH to carry together the scheduling information for the indication.

10. The method according to claim 1, wherein the cross-carrier scheduling information carries the scheduling information by utilizing a padding bit and a preset new bit in the PDCCH to carry together the scheduling information for the indication.

11. A user equipment (UE) for transmitting physical downlink shared channel (PDSCH) data, the UE comprising:
a receiver configured to receive cross-carrier scheduling information in a physical downlink control channel (PDCCH) of a cell for scheduling, the cross-carrier scheduling information carrying scheduling information indicating at least one PDSCH in at least one sub-frame of a cell being scheduled in cross-carrier scheduling;
a controller configured to process data of the at least one PDSCH related to the indication based on the received cross-carrier scheduling information, wherein a corresponding relation between the PDCCH and the PDSCH satisfies a PDSCH in a downlink sub-frame of the cell being scheduled is exclusively cross-carrier scheduled by a PDCCH in a downlink sub-frame of the cell for scheduling, the PDSCH in the downlink sub-frame of the cell being scheduled is included in a downlink association set of the cell being scheduled, and the downlink association set includes a plurality of downlink sub-frames determined by a hybrid automatic repeat request acknowledgement (HARQ-ACK) timing relation; and
a transmitter configured to transmit a HARQ-ACK message to a base station based on the processed result.

12. The UE according to claim 11, wherein the corresponding relation between the PDCCH and the PDSCH further satisfies:

for a sub-frame, if the sub-frame is a downlink sub-frame in both the cell being scheduled and the cell for scheduling, then the PDSCH in the downlink sub-frame of the cell being scheduled is cross-carrier scheduled by the PDCCH in the downlink sub-frame of the cell for scheduling.

13. The UE according to claim 11, wherein the corresponding relation between the PDCCH and the PDSCH further satisfies:

for a sub-frame, if the sub-frame is a downlink sub-frame in the cell being scheduled, and is an uplink sub-frame in the cell for scheduling, then the PDSCH in the downlink sub-frame of the cell being scheduled is cross-carrier scheduled by the PDCCH in the downlink sub-frame of the cell for scheduling, which is in the downlink association set and located before the downlink sub-frame of the cell being scheduled.

14. The UE according to claim 11, wherein the corresponding relation between the PDCCH and the PDSCH further satisfies:

for a sub-frame, if the sub-frame is a downlink sub-frame in the cell being scheduled, and is an uplink sub-frame in the cell for scheduling, then the PDSCH in the downlink sub-frame of the cell being scheduled is cross-carrier scheduled by the PDCCH in the downlink sub-frame of the cell for scheduling, which is in the downlink association set, located before the downlink sub-frame and is the nearest one to the downlink sub-frame of the cell being scheduled.

15. The UE according to claim 11, wherein the corresponding relation between the PDCCH and the PDSCH further satisfies:

for a sub-frame, if the sub-frame is a downlink sub-frame in the cell being scheduled, and is an uplink sub-frame in the cell for scheduling, and there is no downlink sub-frame in the cell for scheduling which is in the downlink association set and located before the downlink sub-frame of the cell being scheduled, then the PDSCH in the downlink sub-frame of the cell being scheduled will not be cross-carrier scheduled.

16. The UE according to claim 11, wherein the downlink association set is determined by a HARQ-ACK timing relation of a PDSCH of the UE in non cross-carrier scheduling, or is determined by a preset HARQ-ACK timing relation of the PDSCH of the cell being scheduled and specially used in cross-carrier scheduling.

17. The UE according to claim 11, wherein the cross-carrier scheduling information carries the scheduling information by utilizing a downlink assignation indicator (DAI) in the PDCCH to carry the scheduling information for the indication.

18. The UE according to claim 11, wherein the cross-carrier scheduling information carries the scheduling information by utilizing a carrier indicator field (CIF) in the PDCCH to carry the scheduling information for the indication.

19. The UE according to claim 11, wherein the cross-carrier scheduling information carries the scheduling information by utilizing a downlink assignation indicator (DAI) and a carrier indicator field (CIF) in the PDCCH to carry together the scheduling information for the indication.

20. The UE according to claim 11, wherein the cross-carrier scheduling information carries the scheduling information by utilizing a padding bit and a preset new bit in the PDCCH to carry together the scheduling information for the indication.

* * * * *